United States Patent
Carrell et al.

(10) Patent No.: US 10,942,665 B2
(45) Date of Patent: Mar. 9, 2021

(54) EFFICIENT MOVE AND COPY

(71) Applicant: International Business Machines Corporation, Armonk, NY (US)

(72) Inventors: John R. Carrell, Geneva, IL (US); Ethan S. Wozniak, Park Ridge, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/409,526

(22) Filed: May 10, 2019

(65) Prior Publication Data

US 2020/0356296 A1    Nov. 12, 2020

(51) Int. Cl.
*G06F 3/06* (2006.01)
*G06F 9/30* (2018.01)
*G06F 16/907* (2019.01)

(52) U.S. Cl.
CPC .......... *G06F 3/0644* (2013.01); *G06F 3/065* (2013.01); *G06F 3/067* (2013.01); *G06F 3/0619* (2013.01); *G06F 9/30196* (2013.01); *G06F 16/907* (2019.01)

(58) Field of Classification Search
CPC ...... G06F 3/067; G06F 3/0619; G06F 3/0644; G06F 3/065; G06F 16/907; G06F 9/30196; G06F 11/0727; G06F 11/1076; G06F 11/0769
USPC .................................................. 711/170, 165
See application file for complete search history.

(56) References Cited

U.S. PATENT DOCUMENTS

| | | | |
|---|---|---|---|
| 7,555,527 B1 | 6/2009 | Slaughter et al. | |
| 7,660,866 B2 | 2/2010 | Chambliss et al. | |
| 10,073,652 B2 | 9/2018 | Hegde et al. | |
| 2015/0242273 A1* | 8/2015 | Resch | G06F 21/62 |
| | | | 714/763 |
| 2016/0210080 A1 | 7/2016 | Frank et al. | |
| 2017/0153946 A1 | 6/2017 | Baptist et al. | |
| 2017/0353552 A1* | 12/2017 | Ober | G06F 16/1824 |
| 2018/0107415 A1 | 4/2018 | Motwani et al. | |
| 2018/0109618 A1 | 4/2018 | Volvovski et al. | |

FOREIGN PATENT DOCUMENTS

WO          03107142 A2    12/2003

* cited by examiner

*Primary Examiner* — Hua J Song
(74) *Attorney, Agent, or Firm* — James Nock; Andrew D. Wright; Roberts Calderon Safran & Cole. P.C.

(57) ABSTRACT

A method begins by receiving a request for a move data function regarding a data object, where the data object is stored at a source DSN location in a first bucket of memory of the DSN. The move data function includes a target DSN location within a second bucket of the memory of the DSN. The method continues by determining dispersed storage error encoding parameters of the first and second buckets. When dispersed storage error encoding parameters of the first and second buckets substantially match, the method continues by creating new metadata, regarding the data object being stored at the target DSN location, that includes a logical address to logical address mapping such that the target DSN location points to the source DSN location and the data object is not physically present at a physical address space that corresponds to the target DSN location.

12 Claims, 12 Drawing Sheets

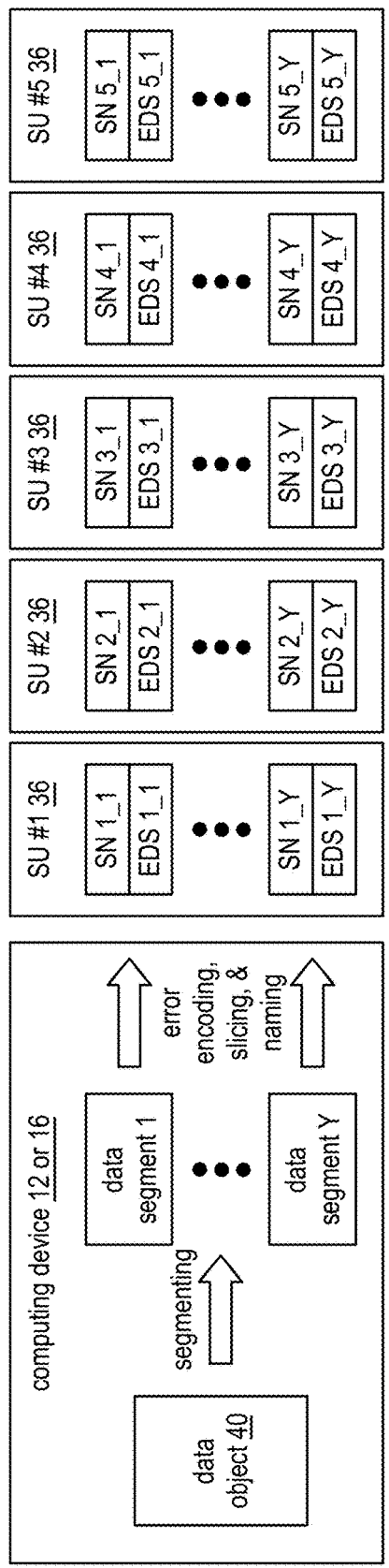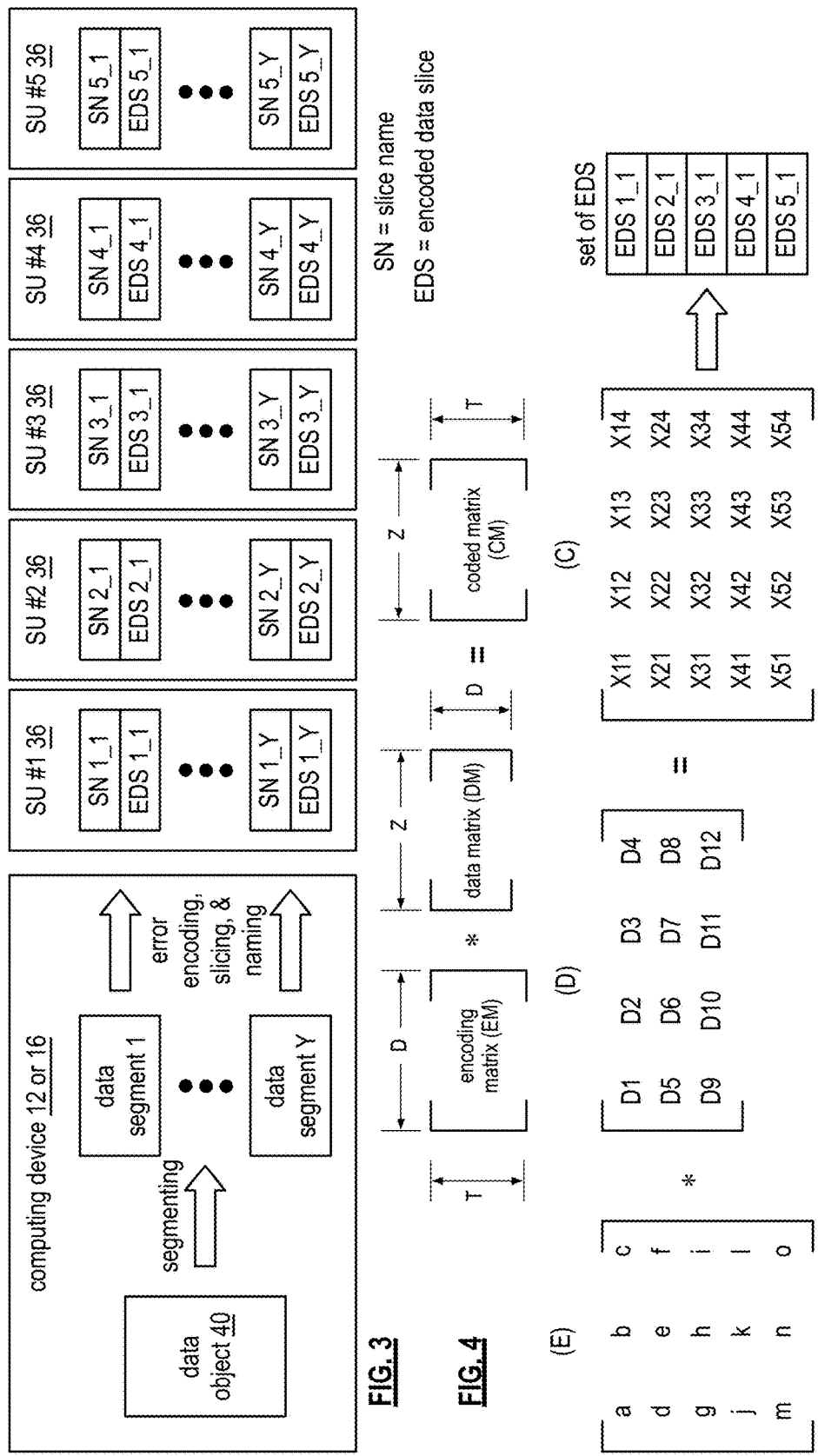

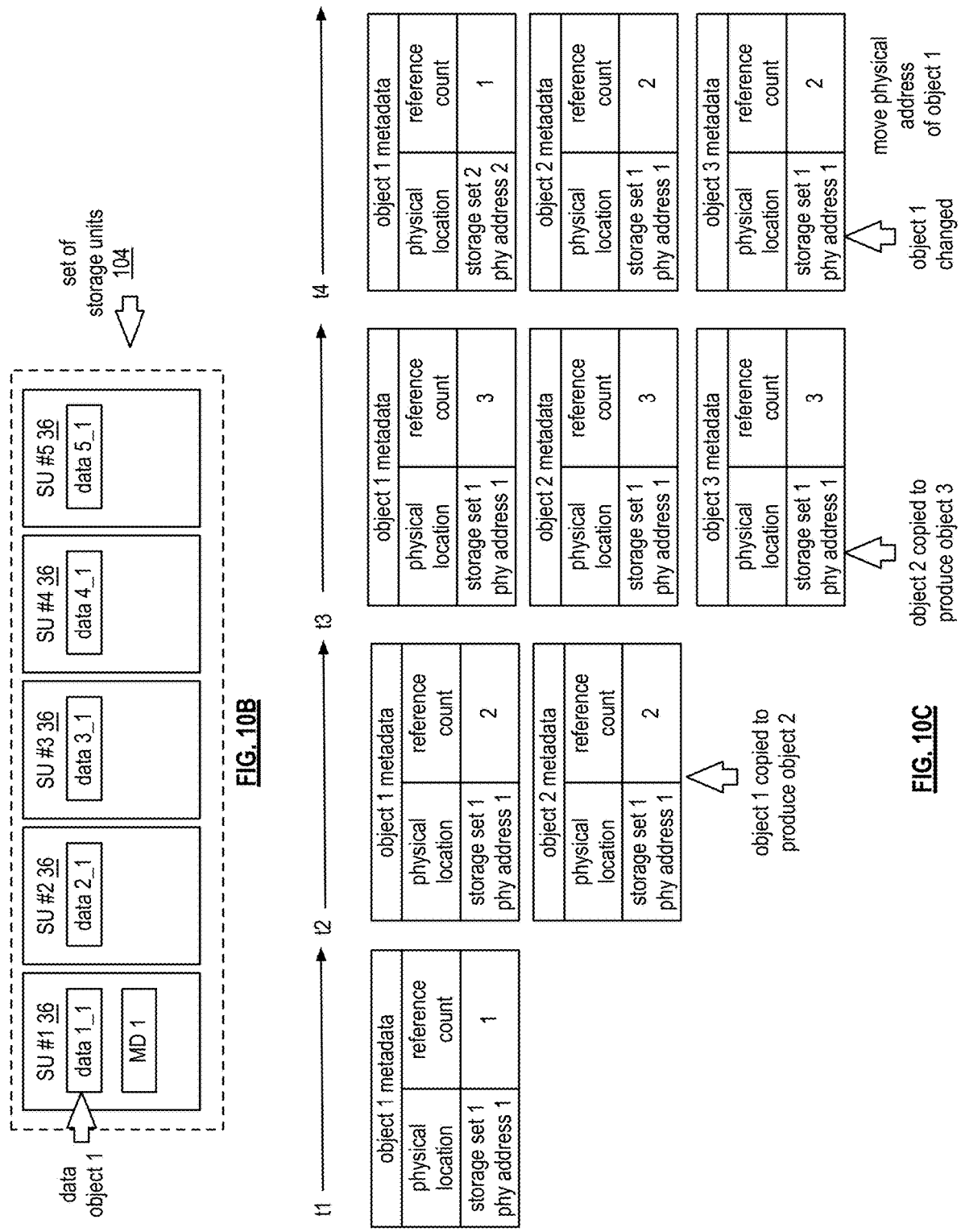

EFFICIENT MOVE AND COPY

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to storage of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10B is a schematic block diagram of an embodiment of storing data in a set of storage units in accordance with the present invention;

FIG. 10C is a schematic block diagram of an example of copying a data in accordance with the present invention;

DETAILED DESCRIPTION OF THE INVENTION

Figure 1:
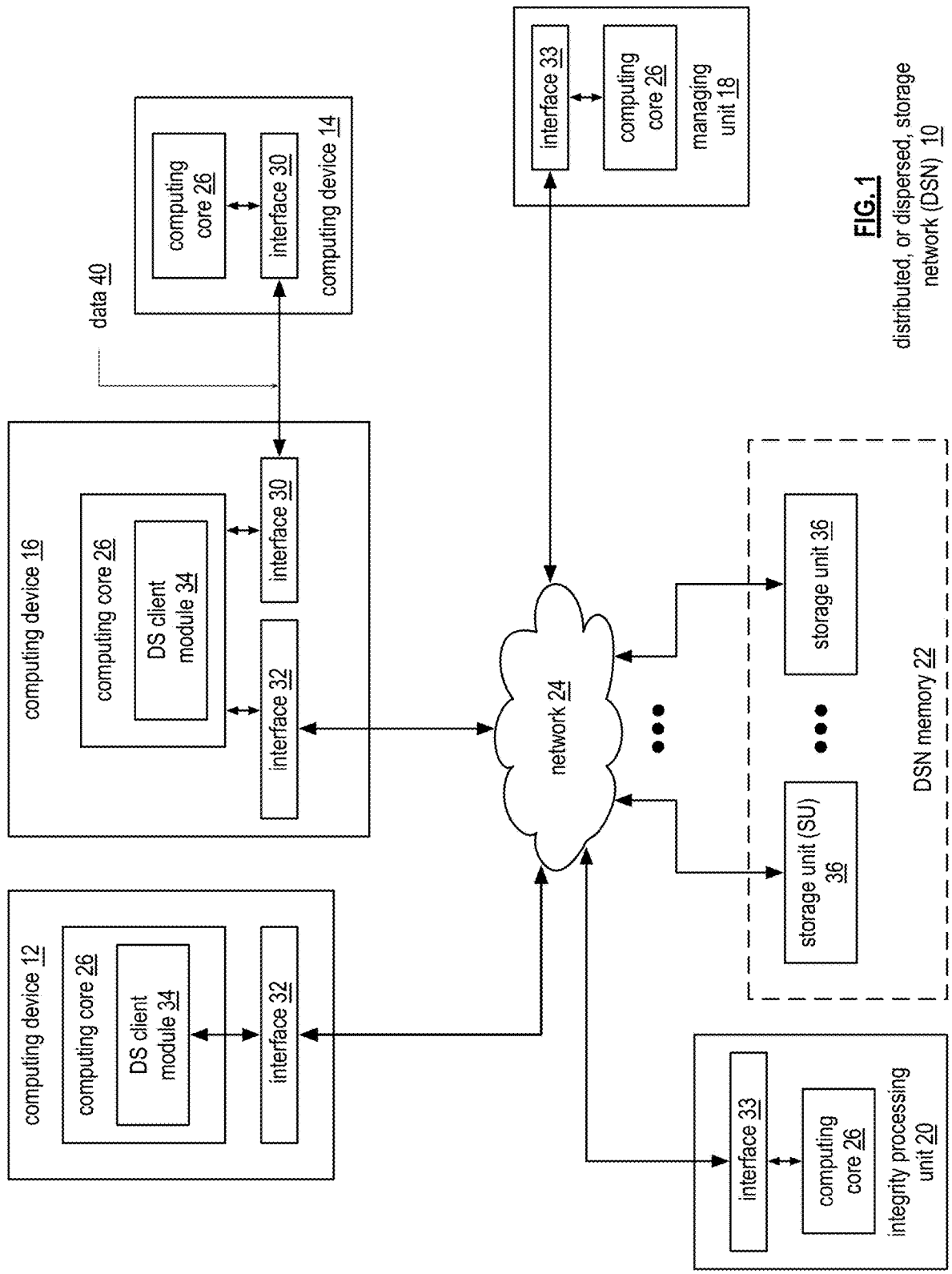
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
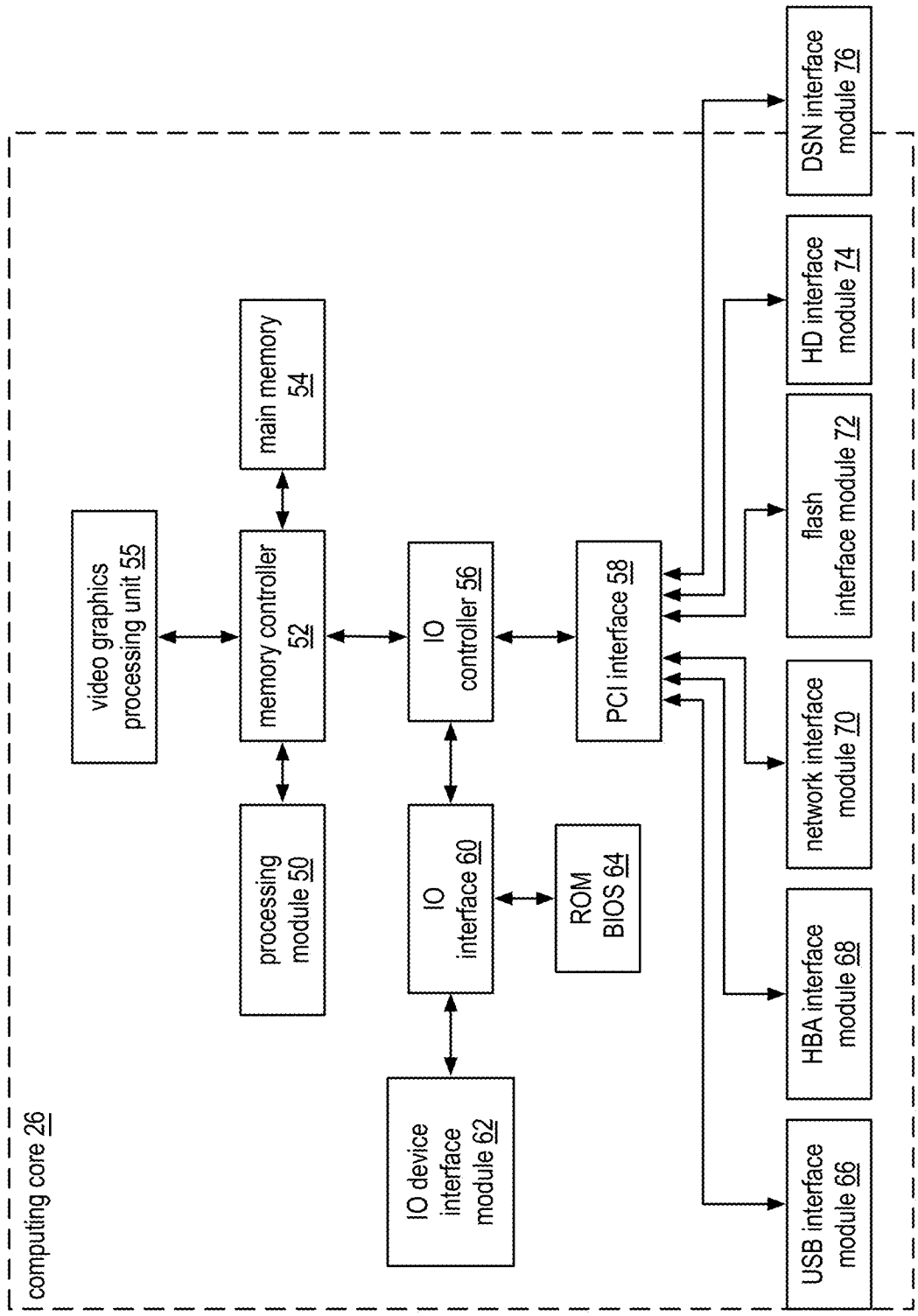
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/ or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 78 is shown in FIG. 6. As shown, the slice name (SN) 78 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
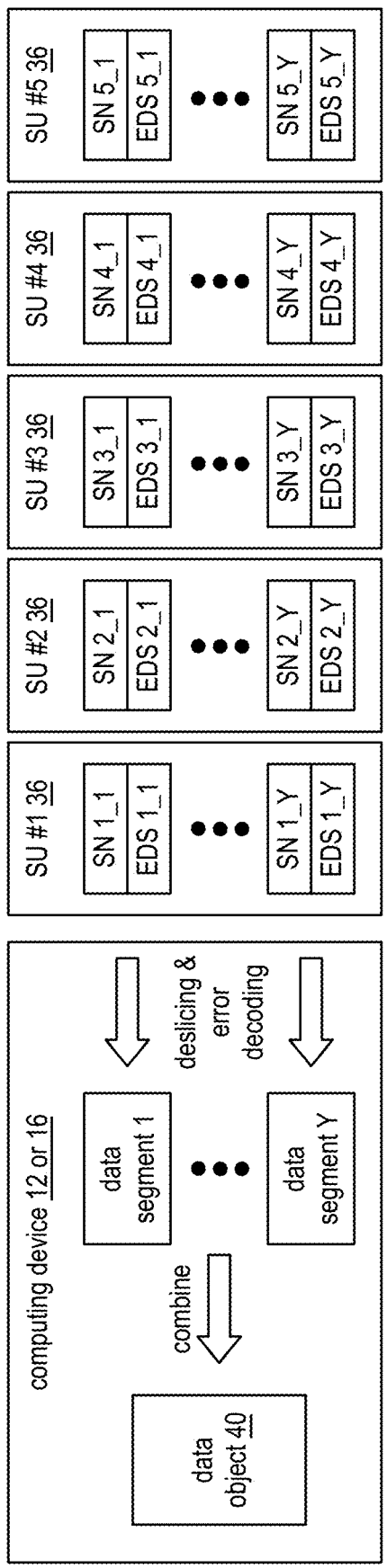
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
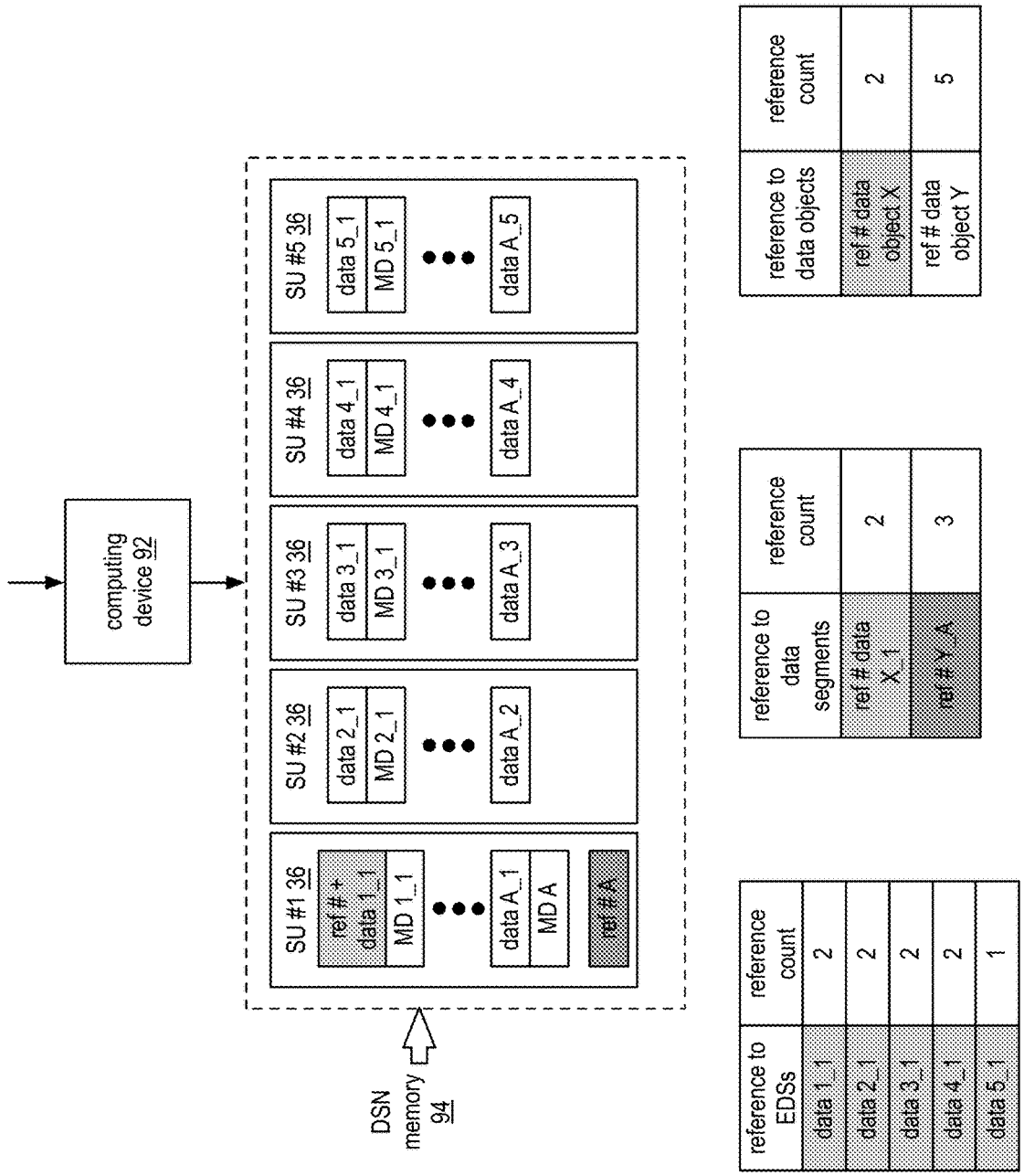
FIG. 9 is a schematic block diagram of another embodiment of a dispersed storage network in accordance with the present invention.

FIG. 9 is a schematic block diagram of another embodiment of a dispersed storage network (DSN) that includes a computing device 92 and a DSN memory 94. The computing device 92 may be implemented by one of the computing devices 12-16, the managing unit 18, and the integrity processing unit 20 of FIG. 1. The DSN memory 94 may be implemented by the DSN memory 22 of FIG. 1.

From time to time, requesters (e.g., computing device 92, another computing device associated with a user of the DSN, etc.) perform move data functions (e.g., copy and delete, copy and move, etc) on the data that is stored in the DSN memory 94. When new data (e.g., as a result of performing a copy) has the same storage configuration settings (e.g., same permissions in an access control list, same dispersed storage error encoding parameters, same encryption function, etc.) as existing data, the amount of work that needs to be done to complete the move data functions can be reduced by reusing existing data (e.g., a data object, a data segment, a set of encoded data slices, etc.) and manipulating the pointers to the data from metadata regarding the data.

As an example, for a copy and delete (e.g., a move) function, the computing device verifies the storage configuration settings for the new and existing data are substantially the same. When the same, the computing device writes a new metadata source for the new data name, and makes the new metadata source point to the existing data. The computing device then deletes old metadata for the existing data. As another example, for a copy and move (e.g., a copy) function, the computing device, verifies the storage configuration settings for the copy data and existing data are substantially the same. When yes, the computing device writes a new metadata source for the copy, and makes the new metadata source point to the existing data.

Thus, the data (e.g., a data object, a data segment of the data object, an encoded data slice of the data segment) in some instances would be referenced by two separate metadata sources (e.g., the existing data and the copied data). Thus, the computing device may determine to track the number of references (e.g., a reference count) to the data. In one example, a group of data segments (which are named or grouped logically) are referenced by a single reference count. As another example, each data segment of a group of data segments are referenced by their own reference count. The reference count is incremented by the computing device each time a computing device add a reference to the data and is decremented each time a computing device removes the reference from the data (e.g., deleting data that is referenced). In one instance, when the reference count for data is zero, the computing device deletes the data. The move data functions are discussed further with reference to FIGS. 10-15.

As illustrated, storage units (e.g., a plurality of sets of storage units, a set of storage units, etc.) of the DSN memory store data (e.g., data 1_1 through data 5_1, data A_1 through data A_5, etc.). The DSN memory also stores metadata (e.g., MD 1_1 through MD 5_1, MD A) regarding the data and/or reference data (e.g., ref #+data 1_1, ref #A).

The reference data includes an identification of associated data and the number of times (e.g., reference counts) the associated data has been referenced. For example, encoded data slice data 1_1 has been referenced 2 times in the DSN. As another example, data segment X_1 has been referenced 2 times in the DSN. As yet another example, data object Y has been referenced 5 times in the DSN. Note the reference count may be specific for one or more of a variety of locations within the DSN. For example, the reference count indicates how many times certain data is stored in the DSN. As another example, the reference count indicates how many times certain data is stored in a storage pool. As still another example, the reference count indicates how many times certain data is stored in a vault. As yet another example, the reference count indicates how many times certain data is stored in a set of storage units.

The storage location of the reference count may also vary. For example, the reference count is stored in at least a portion of the data it is referencing (e.g., ref #+data 1_1). As another example, the reference count is stored in metadata regarding the data. As yet another example, the reference count is stored as a separate metadata source (e.g., MD A) regarding the reference count of the data. The storage location of the reference count may also be determined by processing costs (e.g., size of referenced data, frequency of access of the referenced data, etc.) associated with the reference count and the data the reference count is referencing. For example, the reference count is stored embedded in a data segment of the data when the data is below a size threshold. As another example, the reference count is stored as a separate metadata source when the data is greater than or equal to the size threshold. As another example, the reference count is stored in metadata of the data when a frequency of access of the data is greater than or equal to a frequency threshold.

Figure 10A:
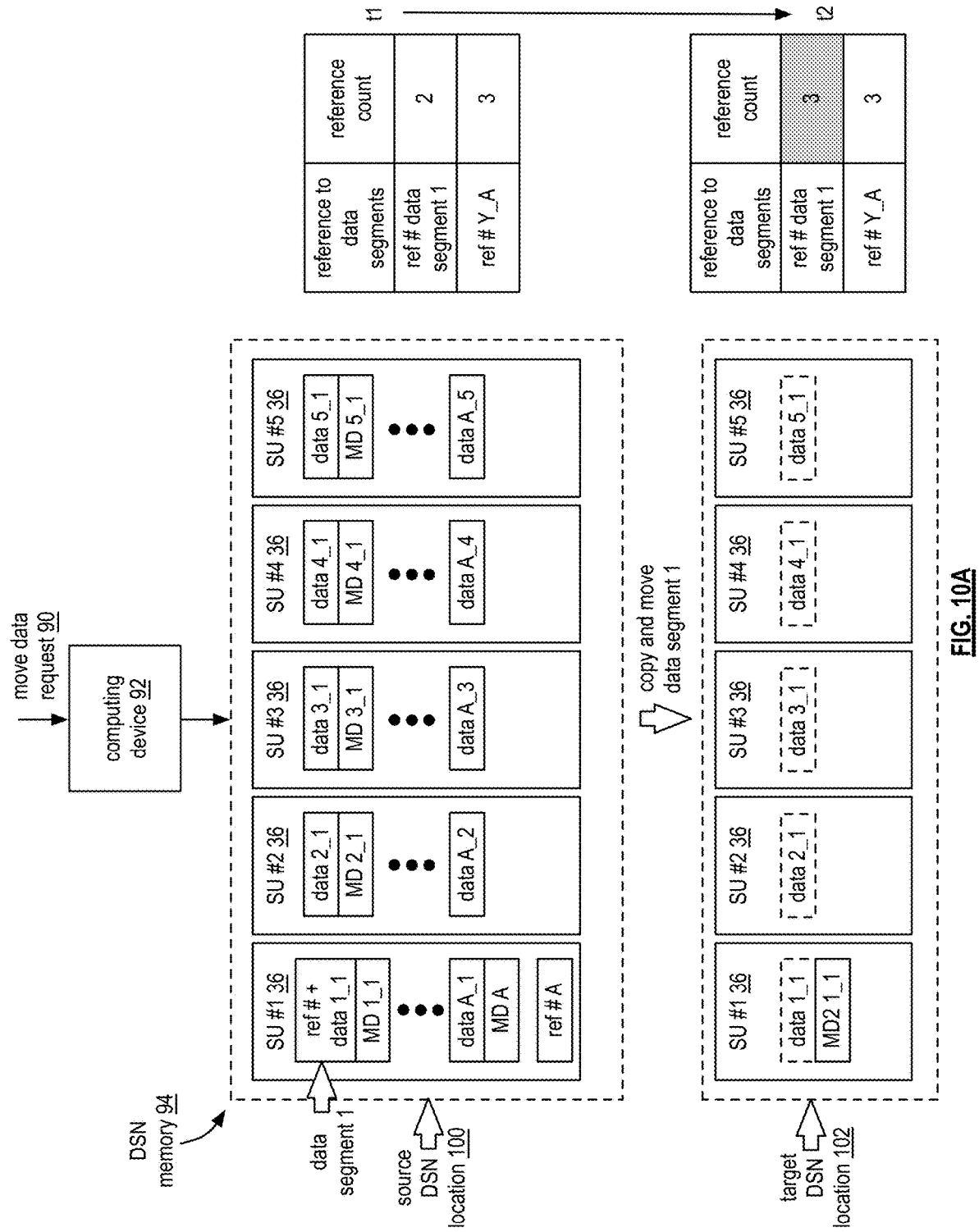
FIG. 10A is a schematic block diagram of another embodiment of a dispersed storage network in accordance with the present invention.

FIG. 10A is a schematic block diagram of another embodiment of a dispersed storage network (DSN) that includes a computing device 92 and a DSN memory 94. The computing device 92 may be implemented by one of the computing devices 12-16, the managing unit 18, and the integrity processing unit 20 of FIG. 1. The DSN memory 94 may be implemented by the DSN memory 22 of FIG. 1. The DSN memory 94 includes a source DSN location 100 (e.g., a range of logical addresses) and a target DSN location 102 (e.g., a second range of logical addresses). Note the source DSN location and the target DSN location may be address ranges that are associated with one or more of a same set of storage units, at least some different storage units of a set of storage units, and different sets of storage units.

In an example of operation of maintaining reference counts, the computing device performs a copy and move function on data segment 1 to copy the data segment from the source DSN location 100 to the target DSN location 102. Note that data segment 1 has been dispersed storage error encoded into a set of encoded data slices (e.g., data 1_1 through data 5_1). The reference count illustrates that at time 1 (t1) the reference count for data segment 1 is 2 and at time 2 (t2) the reference count for data segment 1 has been updated to 3 (e.g., due to the copy and move function).

Note that metadata regarding the copied data has been created (e.g., MD2 1_1) and is stored in the set of storage units #1-5 36. The creation of metadata is discussed in further detail with reference to FIGS. 11-15. Further note, in this example, the reference count is stored in a first encoded data slice (data 1_1) of the data segment 1. However, the reference count may be stored in metadata (e.g., object metadata) or as a separate metadata source (e.g., reference metadata).

FIG. 10B is a schematic block diagram of an embodiment of storing data in a set of storage units 104 that include storage units #1-#5 36. The storage units store a data object 1 (e.g., as encoded data slices data 1_1 through data 1_5. The storage units also store metadata (e.g., MD 1) regarding the data object 1. In one example, the metadata is stored in different storage than the data object 1.

FIG. 10C is a schematic block diagram of an example of copying a data object (e.g., data object 1 stored in the set of storage units 104) in a dispersed storage network (DSN). Metadata associated with the data object (e.g., object 1 metadata) includes a physical location (e.g., physical addresses of storage units storing the data object) and a reference count. In one example, the reference count is stored separately from the object metadata. Note the object 1 metadata may further include other information (e.g., type, size, timestamp, etc.) regarding object 1.

In a specific example of operation, at time t1, data object 1 is stored in the set of storage units 104 (e.g., storage set 1). Object 1 metadata includes a physical location and a reference count. The physical location points to storage set 1 and the reference count is 1 as only one piece of metadata (e.g., one metadata source) is pointing to the data object 1.

At a second time t2, object 1 is copied to create object 2. Object 2 metadata is then created with a physical location that points to storage set 1 and a reference count of 2 as object 1 metadata and object 2 metadata both point to the same underlying physical addresses of object 1. The reference count associated with object 1 metadata is incremented to 2.

At time t3, the object 2 is copied to produce object 3. Thus, metadata for object 3 is generated to include the physical address location of object 1 and a reference count of 3 as object 1 metadata, object 2 metadata and object 3 metadata all point to the physical location of object 1.

At time t4, object 1 is changed which causes a disconnect with regards to object 2 and object 3 metadata, as object 2 and object 3 metadata points to the unchanged object 1 and object 1 metadata is to be updated to reflect the change to object 1. The disconnect may be resolved by a variety of approaches.

In a first approach, the system determines to keep all data objects and data object copies consistent (e.g., substantially the same). For example, when object 1 is changed, the system (e.g., a computing device of the system (e.g., the DSN)) makes the change to objects 2 and 3 (e.g., modifies the metadata, leaves metadata unchanged (e.g., still points to same physical location and has same reference count), deletes metadata, etc.). Note the determination may be based on one or more of a predetermination, a command, and a DSN protocol. In a second approach, the system determines to change one or more copies. For example, when object 1 is changed, the system changes object 2, and leaves unchanged object 3. In this example, object 3 would be physically written to memory (e.g., other physical addresses in the set of storage units, another set of storage units, etc.) and the metadata 3 would be updated with the updated reference count of 1 and the physical storage location (e.g., the other physical addresses). Object 1 and 2 would still have their metadata point to the same physical storage location and have their reference counts decremented to 2.

In a third approach, the system only changes the changed object. For example, when object 1 is changed, the system changes object 1, and leaves unchanged (e.g., does not cause the metadata of objects 2 and 3 to be the same as metadata of object 1) objects 2 and 3. In this example, the underlying data segments of object 1 are copied into a new physical storage location of the DSN and the object 1 metadata is updated. Further, the metadata of objects 2 and 3 keep the same physical storage location but decrement their reference count by 1.

The determination of which approach to use may be based on one or more of the number of metadata sources reference the underlying data object (or data segment, set of encoded data slices, etc.), based on where the metadata is stored (e.g., embedded in a data segment, stored as a separate metadata source, stored in the object metadata), and whether physical location of the data objects are able to be moved (e.g., according to user permissions, according to a vault threshold, etc.).

In the specific example of FIG. 10C, the computing device determines to move the physical location of object 1, and to keep the physical storage location for objects 2 and 3. Thus, only one metadata source will point to the changed object 1, and two metadata sources will remain pointing to the underlying stored data object. Thus, the computing device copies stores the changed object 1 in a second physical storage location of the DSN and updates object 1 metadata to include the second physical storage location and the reference count of 1. The computing device then updates the metadata of objects 2 and 3 to reflect the updated reference count of 2.

Figure 11:
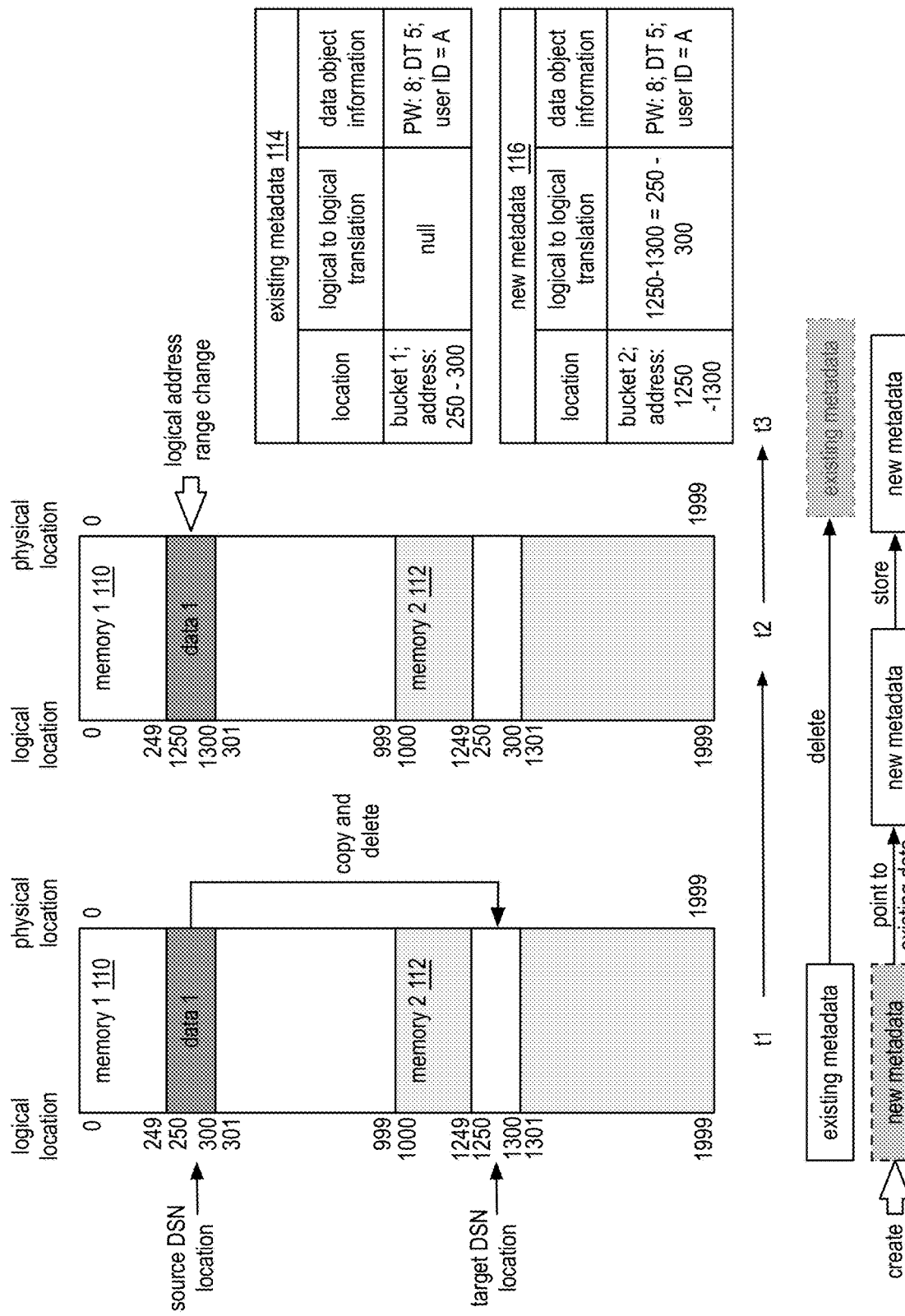
FIG. 11 is a schematic block diagram of an example of a move data function in accordance with the present invention.

FIG. 11 is a schematic block diagram of an example of a move data function, where the move data function is a copy and delete function. As illustrated, a first bucket of memory (e.g., memory 1 110 which includes logical addresses 0 through 999) includes a source dispersed storage network (DSN) location (e.g., logical addresses 250 through 300). A second bucket of memory (e.g., memory 2 112 which includes logical addresses 1000 through 1999) includes a target DSN location (e.g., logical addresses 1250 through 1300). The memory 1 110 and the memory 2 112 also correspond to physical addresses (e.g., shown as physical address 0 through 1999 for simplicity) of DSN memory (e.g., a storage unit, a set of storage units, a plurality of memory devices, etc.). In one example, the memory 1 110 is older memory and the memory 2 112 is newer (e.g., recently added) memory.

Also illustrated is existing metadata 114 and new metadata 116 which include a location field, a logical to logical translation field, and a data object information field. The location field indicates the logical address(es) of the data. The location field may also include a bucket identifier (e.g., address namespace). The logical to logical translation field indicates whether a logical to logical translation is present. The data object information includes one or more of a slice name, a DSN address, a data size, a data type, and dispersed storage error encoding parameters. The dispersed storage error encoding parameters include one or more of an error coding function, an encryption function, a pillar width number, a decode threshold number, a number of data segment per data object, and a vault identifier.

In an example of operation of the copy and delete function, a computing device of the DSN receives a request to move data 1 from the source DSN location to the target DSN location. The computing device determines whether storage configuration settings for the data 1 stored in the source DSN location are substantially similar to storage configuration settings for the data 1 to be stored in the target DSN location. For example, the computing device determines whether a pillar width (PW) number associated with bucket 1 is substantially similar to a PW number associated with bucket 2. As another example, the computing device determines whether an encryption function for the existing data substantially matches an encryption function for the to be moved data. As yet another example, the computing device determines whether an access control list for a user associated with the copy and delete function has permissions in both the first and second buckets that allow the copy and delete function.

In this specific example, when the storage configuration settings are substantially similar, the computing device performs the copy and delete function by creating new metadata 116 (e.g., at time t1) to include the location field the target DSN location of 1250-1300, a logical to logical translation from the target DSN location 1250-1300 to the source DSN location 250-300, and data object information to include a pillar width number of 8, a decode threshold number of 5 and a user ID of A (e.g., the same as the existing data 1).

Due to the logical to logical translation (shown in time t2), it appears to the user that the data has moved to a new bucket (e.g., from the first to the second), which based on a logical to physical address mapping would change the physical address of the data 1. However, due to the logical to logical translation, the data is "moved" in the logical address location without changing the underlying physical storage location of the data.

After creation and storage of the new metadata 116 (e.g., t3), the computing device deletes the existing metadata 114. The computing device further may establish a second logical address to logical address mapping of the source DSN location to the target DSN location such that, for a subsequent data object written to the source DSN location (e.g., addresses 250-300), the subsequent data object is stored at the physical address space that corresponds to the target DSN location (e.g., addresses 1250-1300). This is shown in the memory 1 110 and the memory 2 112 during (t2) in that the logical address to physical mapping of memory 1 includes logical addresses 0-249, 1250-1300, and 301-999 and the logical address to physical mapping of memory 2 includes logical addresses 1000-1249, 250-300, and 1301-1999.

Figure 12:
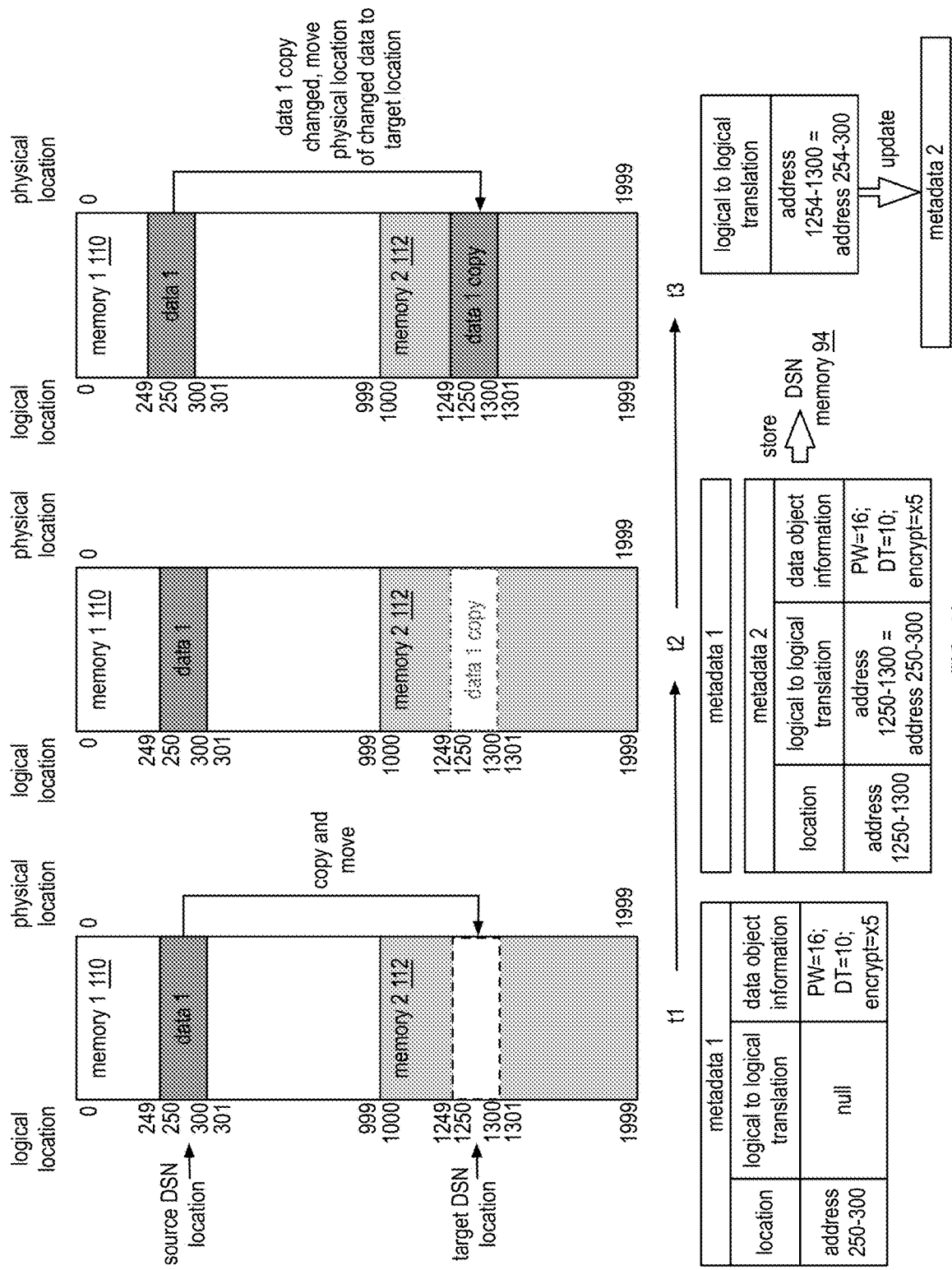
FIG. 12 is a schematic block diagram of another example of a move data function in accordance with the present invention.

FIG. 12 is a schematic block diagram of another example of a move data function. In this example, the move data function is a copy and move function. As illustrated, a first bucket of memory (e.g., memory 1 110 which includes logical addresses 0 through 999) includes a source dispersed storage network (DSN) location (e.g., logical addresses 250 through 300). A second bucket of memory (e.g., memory 2 112 which includes logical addresses 1000 through 1999) includes a target DSN location (e.g., logical addresses 1250 through 1300). The memory 1 110 and the memory 2 112 also correspond to physical addresses (e.g., shown as physical address 0 through 1999 for simplicity) of DSN memory (e.g., a storage unit, a set of storage units, a plurality of memory devices, etc.). For example, the first bucket has a logical address to physical address mapping such that logical addresses of the first bucket map to physical address 0 through 999. As another example, the second bucket has a logical address to physical address mapping such that logical addresses of the second bucket map to physical address 1000 through 1999.

In an example of operation of the copy and move function, a computing device of the DSN determines to copy and move data 1 from a source DSN location in bucket 1 (which maps to a first physical address range of DSN memory) to a target DSN location in bucket 2 (which maps to a second physical address range of DSN memory). At time t1, metadata 1 includes the source DSN location (e.g., logical addresses 250-300), a logical to logical translation field of null, and a data object information field that includes a pillar width (PW) of 16, a decode threshold (DT) of 10, and an encryption type of "x5".

At time t2, the computing device creates metadata 2 regarding the creation of the data 1 copy. The metadata 2 includes the target DSN location (e.g., logical addresses 1250-1300), a logical address to logical address mapping that points to the source DSN location (e.g., logical addresses 1250-1300), and data object information that includes a pillar width (PW) of 16, a decode threshold (DT) of 10, and an encryption type of "x5". The computing device stores both the metadata 1 and the metadata 2 in DSN memory 94.

At time t2, the data 1 copy (shown in a light grey dashed rectangle in memory 2) is stored at the target DSN location, but is not physically present at the physical addresses corresponding to the target DSN location (e.g., physical address 1250-1300). Instead, data 1 and the data 1 copy are physically present at physical addresses 250-300, which correspond to logical addresses 250-300 of bucket 1 and through a logical to logical address translation, logical addresses 1250-1300 of bucket 2.

At t3, one or both of at least a portion of the data 1 and the data 1 copy are changed. As such, when any of the at least a portion of the data 1 and the data 1 copy has been changed, that portion for the data object 1 copy is physically moved to respective physical addresses that correspond to a respective portion of the target DSN location. For example, data 1 is a data object that is divided into a plurality of data segments. A first data segment copy of the plurality of data segments is changed (e.g., modified). The first data segment copy corresponds to logical addresses 1250-1253. Due to the first data segment and the first data segment copy not being the same, the first data segment of the data 1 is copied and the copy is physically moved (e.g., written) to physical addresses 1250-1253, which correspond to a portion of the target DSN location within bucket 2. Note in this example, when the change is to the first data segment of data 1 instead of the data 1 copy, the changed first data segment would also be written to the portion of the source DSN location within bucket 1 that correspond to physical addresses 250-253.

Having updated the storage of the first data segment and the first data segment copy, the computing device updates metadata 2. For example, now that target DSN location 1250-1253 corresponds with physical addresses 1250-1253 of the DSN memory, the computing device updates the logical to logical translation field to indicate only logical addresses 1254-1300 of the target DSN location are mapped to logical addresses 254-300 of the source DSN location. The computing device then stores the updated metadata in the DSN memory 94.

Figure 13:
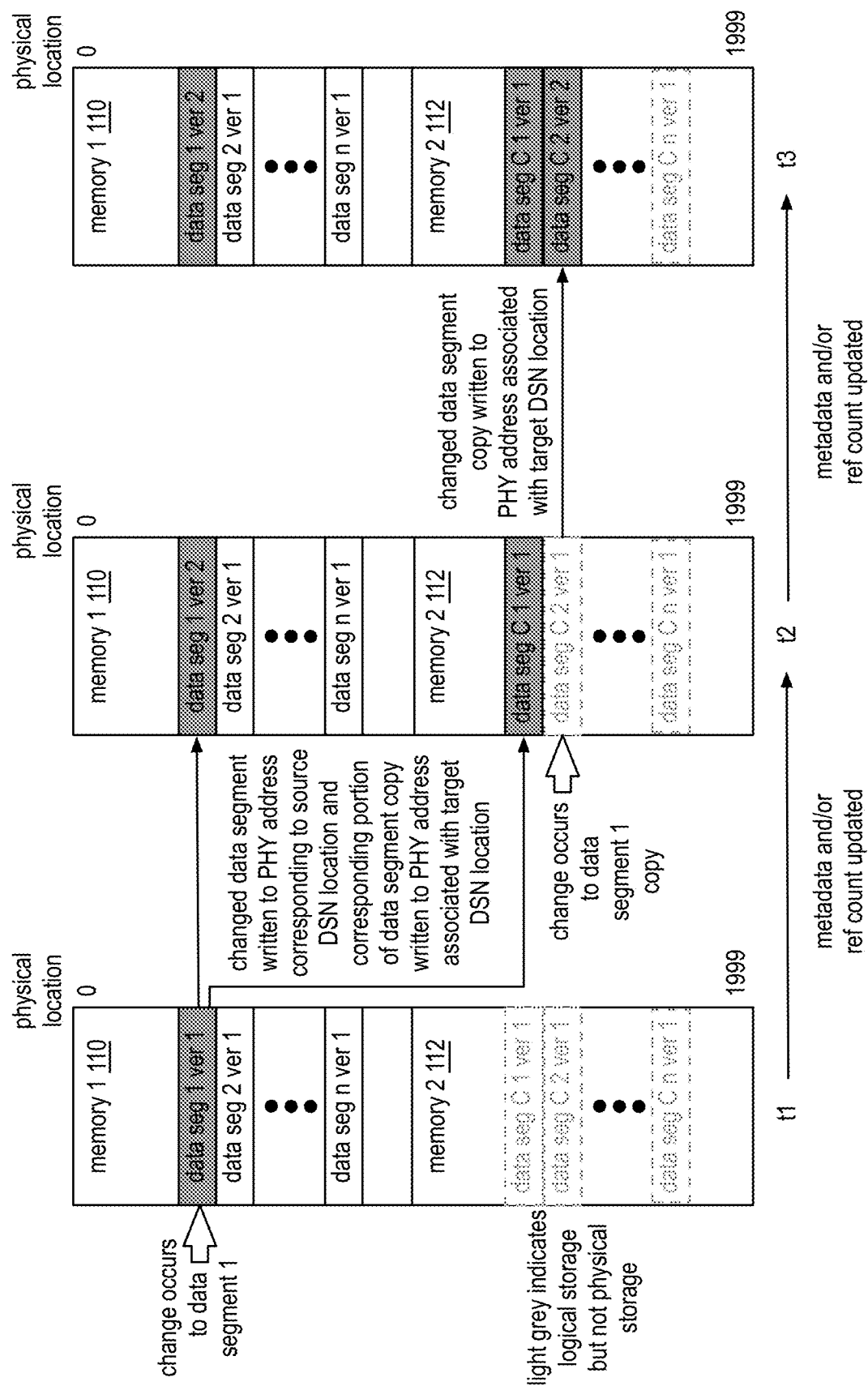
FIG. 13 is a schematic block diagram of another example of a move data function in accordance with the present invention.

FIG. 13 is a schematic block diagram of another example of a move data function. In this example, the move data function is a copy and move. As illustrated, data segment 1 version 1 through data segment n version 1 is logically stored in memory 1 110 (shown in black) and data segment C (copy) 1 version 1 through data segment copy n version 1 is logically stored in memory 2 112 (shown in light grey). Note that the data segments 1-n and data segment copies 1-n are only physically stored at physical addresses corresponding to the memory 1 110.

At time t1, a change occurs to the data segment 1 version 1 stored in memory 1 110. For example, the data segment is updated to a next version. The physical location of the data is then modified according to at least one DSN storage approach. In a first DSN storage approach, the data segment and the data segment copy are to remain consistent. For example, when a change occurs to the data segment 1 version 1, the change occurs to the data segment copy 1 version 1. In a second DSN storage approach, the data segment and the data segment copy are independent. For example, when a change occurs to the data segment 1 version 1, the change is not copied to the data segment copy 1 version 1.

In a third DSN storage approach, the data segment and the data segment copy are independent, with a copy the latest version (e.g., a newest version of the data segment is always copied). For example, when a change occurs to the data segment 1 version 1 (e.g., updated to version 2), the change is not copied to the data segment copy 1 version 1, however, a data segment copy 1 version 2 copy is created. Note the storage approach may be different from encoded data slice to encoded data slice, data segment to data segment, and data object to data object. For example, the first DSN storage approach is utilized for a first data object and a second DSN storage approach is utilized for a second data object.

In this specific example, the second DSN storage approach is utilized. As such, the computing device stores the data segment copy 1 version 1 in physical addresses associated with a corresponding target DSN location in memory 2 112 and stores the changed data segment 1 version 2 in physical addresses associated a corresponding source DSN location in memory 1 110. Note if the third storage approach was utilized, the computing device would also copy data segment 1 version 2 and store the copied data segment 1 version 2 into memory of the DSN. Note the storage of the copied data segment 1 version 2 is one or both of logical storage and physical storage. The computing device also updates associated metadata and/or reference counts based on the move data function.

At time t2, a change (e.g., an update to version 2) occurs to the data segment copy 2 version 1. As such, the computing device utilizes the second storage approach and stores the data segment copy 2 version 1 in physical addresses associated with a corresponding target DSN address of memory 2 112 and does not modify the corresponding data segment 2 version 1 stored in physical addresses of a source DSN location of memory 1 110. Thus, at time t3, memory 1 is storing data segment 1 version 2, data segment 2 version 1 through data segment n version 1, and memory 2 112 is storing data segment copy 1 version 1, and data segment copy 2 version 2. As the data segment copy n version 1 has not had a change to it or the corresponding data segment n version 1 from which it was copied, it is not physically stored in physical addresses associated with memory 2 112. Instead, the metadata associated with data segment copy n version 1 points to a portion of a source DSN address that is mapped to physical addresses storing data segment n version 1. The computing device also updates associated metadata and/or reference counts based on the move data function.

Figure 14:
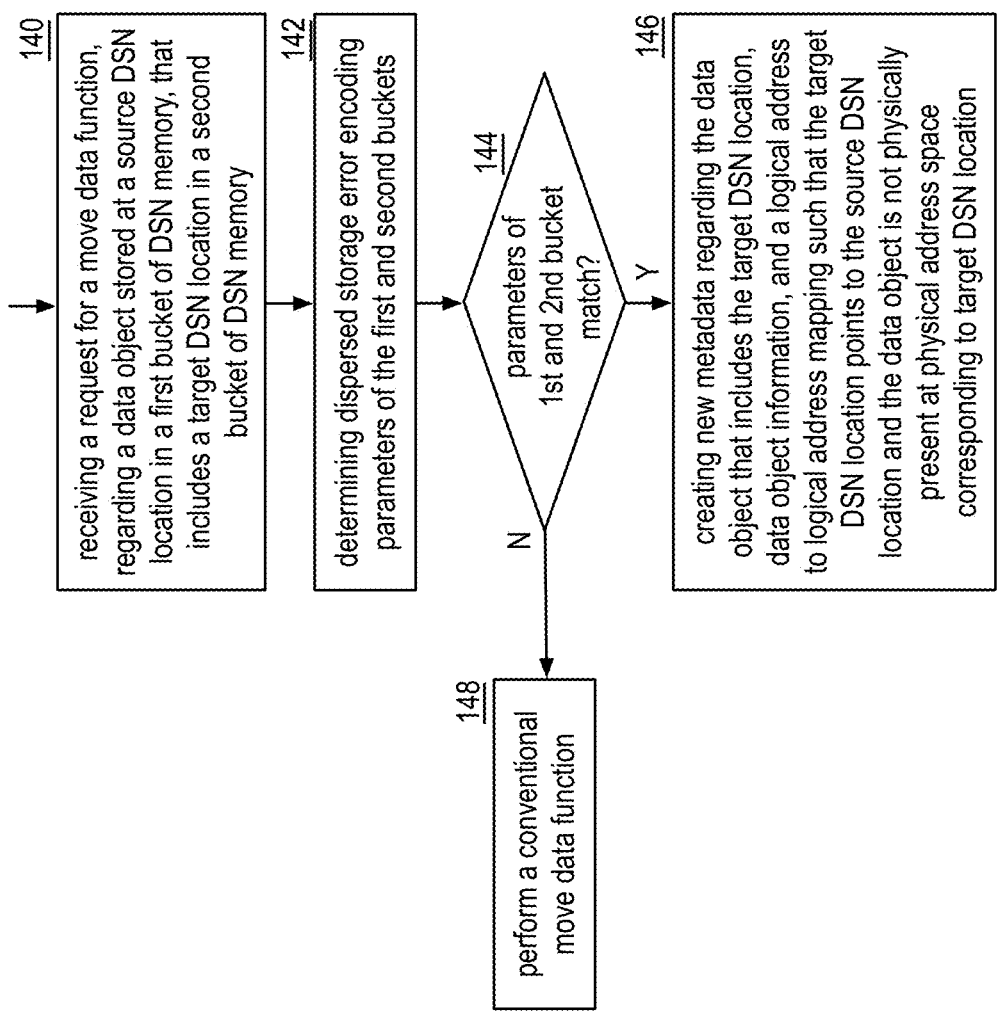
FIG. 14 is a flowchart illustrating an example of a method of a move data function in accordance with the present invention.

FIG. 14 is a flowchart illustrating an example of a method of a move data function that includes step 140, where a computing device of a dispersed storage network (DSN) receives a request for a move data function regarding a data object. The data object includes a plurality of data segments that is dispersed storage error encoded into plurality of sets of encoded data slices and is stored at a source DSN location in a first bucket of memory of the DSN. The move data function includes a target DSN location within a second bucket of the memory of the DSN.

The method continues with step 142, where the computing device determines dispersed storage error encoding parameters of the first and second buckets. The method continues with step 144, where the computing device determines whether the dispersed storage error encoding parameters of the first and second buckets substantially match. When no, the method branches to step 148, where the computing device performs a conventional move data function. For example, when the move data function is a copy and delete function, the computing device creates new metadata that points to the new logical location that is associated with a new physical address. The computing device then moves the data from the existing physical address to the new physical address and deletes existing metadata regarding the data. In one example, the conventional moving includes retrieving a decode threshold number of encoded data slices to recover the data, dispersed storage error encoding the data into another set of encoded data slices, and sending the other set of encoded data slices to storage of the DSN in accordance with the new logical location.

When the computing device determines the dispersed storage error encoding parameters of the first and second buckets substantially match, the method continues to step 146, where the computing device creates new metadata regarding the data object being stored at the target DSN location, wherein the new metadata includes the target DSN location, data object information, and a logical address to logical address mapping such that the target DSN location points to the source DSN location and the data object is not physically present at a physical address space that corresponds to the target DSN location.

Figure 15:
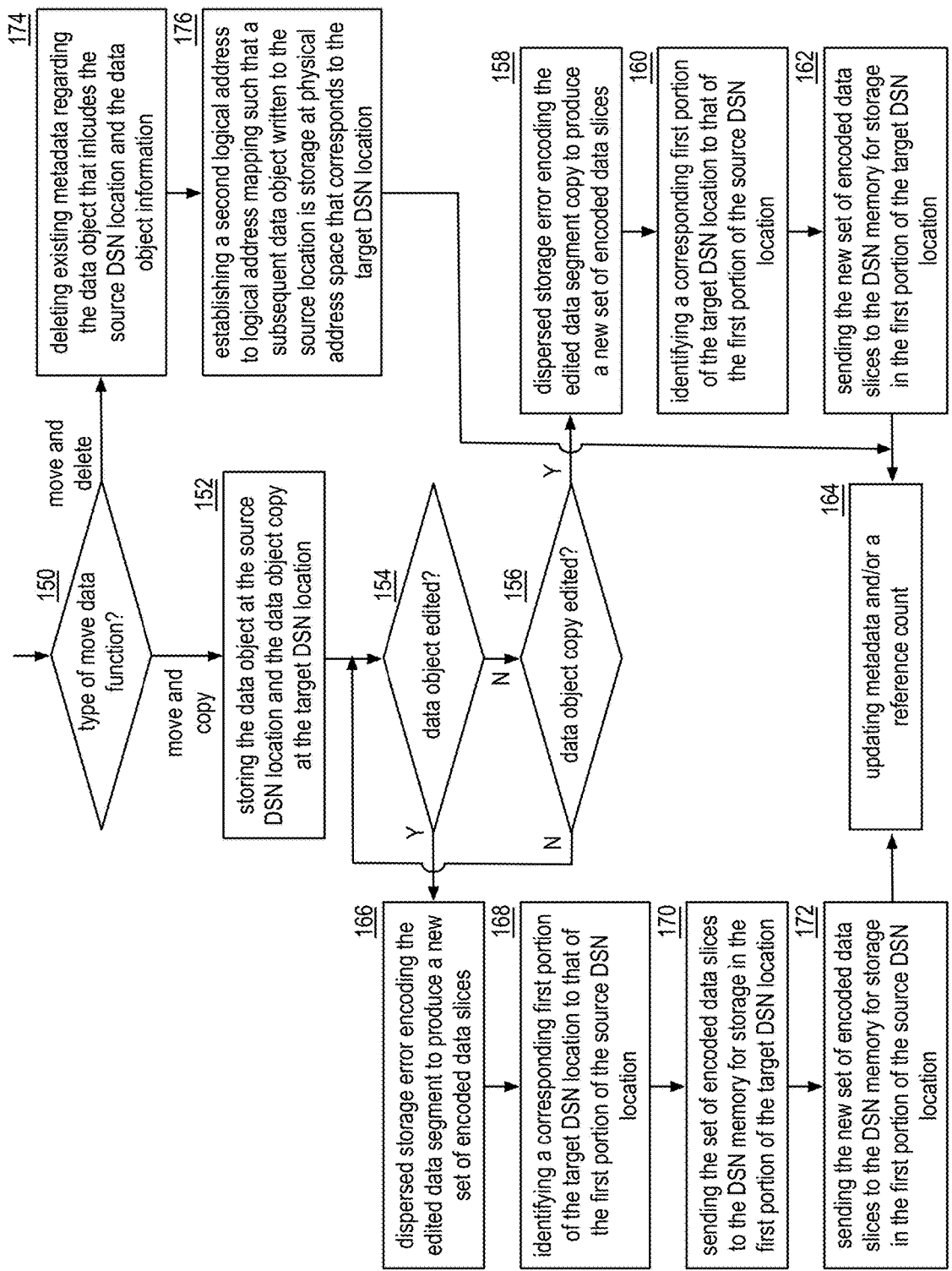
FIG. 15 is a flowchart illustrating another example of a method of a move data function in accordance with the present invention.

FIG. 15 is a flowchart illustrating another example of a method of a move data function that includes step 150, where a computing device of a dispersed storage network (DSN) determines whether a move data function is a move and copy type or a move and delete type. When the move data function is the move and copy, the method continues to step 152, where the computing device causes (e.g., executes a write request to store the data object) the data object to be stored at a source DSN location and a data object copy of the data object to be stored at a target DSN location. The method continues to step 154, where the computing device determines whether the data object has been edited. For example, the computing device receives an edited data segment of the data object from a user device of the DSN and determines the data object has been edited. When the data object has been edited, the method branches to step 166, where the computing device dispersed storage error encodes the edited data segment to produce a new set of encoded data slices.

The method continues to step 168, where the computing device identifies a corresponding first portion of the target DSN location to that of the first portion of the source DSN location. The method continues to step 170, where the computing device sends the set of encoded data slices to the DSN memory for storage in the first portion of the target DSN location. The method continues to step 172, where the computing device sends the new set of encoded data slices to the DSN memory for storage in the first portion of the source DSN location.

The method continues to step 164, where the computing device updates the new metadata such that the logical address to logical address mapping of the first portion of the target DSN location points to the first portion of the target DSN location to reflect that the set of encoded data slices is physically present at a first portion of the physical address space that corresponds to the first portion of the target DSN location.

Alternatively, when the data segment copy is to be modified according to changes made in the corresponding original data segment, the computing device updates the metadata such that first portion of the target DSN location remains pointed to the source DSN location. The computing device further updates (e.g., increases, decreases) a reference count associated with one or more of the data segment and the data segment copy.

When the data object has not been edited, the method continues to step 156, where the computing device determines whether the data object copy has been edited. When the computing device determines the data object copy has not been edited, the method continues back to step 154. When the computing device determines the data object copy has been edited, the method continues to step 158. As another example, the computing device receives an indication (e.g., a message from a DS managing unit) that the data object copy has been edited.

As another example, the computing device receives a request for a data segment of the data object copy, retrieves a corresponding set of encoded data slices of the data segment from a first portion source DSN location, decodes the set of encoded data slices to recover the data segment and sends the recovered data segment to a user device of the DSN. The computing device then receives from the user device, an edited data segment.

The method continues to step 158, where the computing device dispersed storage error encodes the edited data segment copy to produce a new set of encoded data slices. The method continues to step 160, where the computing device identifies a corresponding first portion of the target DSN location to that of the first portion of the source DSN location. The method continues to step 162, where the computing device sends the new set of encoded data slices to the DSN memory for storage in the first portion of the target DSN location.

The method continues to step 164, where the computing device updates the new metadata such that the logical address to logical address mapping of the first portion of the target DSN location points to the first portion of the target DSN location to reflect that the new set of encoded data slices is physically present at a first portion of the physical address space that corresponds to the first portion of the target DSN location. The computing device further updates a reference count. For example, the computing device updates (e.g., decreases) a reference count for the existing data segment (as the data segment copy has been changed) and updates (e.g., increases, creates) a reference count for the data segment copy that was changed.

The method continues to step 174, where the computing device deletes old metadata regarding the data object, wherein the old metadata includes the source DSN location and the data object information. The method continues to step 176, where the computing device establishes a second logical address to logical address mapping of the source DSN location to the target DSN location such that, for a subsequent data object written to the source DSN location, the subsequent data object is stored at the physical address space that corresponds to the target DSN location. The method continues to step 164, where the computing device updates (e.g., creates) metadata such that the target DSN location points to physical addresses that corresponds to the source DSN location. The computing device further updates (e.g., decrements for the delete operation) a reference count.

Note a computer readable storage device that includes one or more elements that store operational instructions that when executed by a computing device, is operable to perform any of the above methods. Further note that a computing device that includes memory, an interface, and a processing module operably coupled to the memory and the interface, is able to perform any of the above methods.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN) comprises:

receiving a request for a move data function regarding a data object, wherein the data object includes a plurality of data segments that is dispersed storage error encoded into plurality of sets of encoded data slices, wherein the plurality of sets of encoded data slices is stored at a source DSN location in a first bucket of memory of the DSN, wherein the move data function includes a target DSN location within a second bucket of the memory of the DSN;

determining dispersed storage error encoding parameters of the first and second buckets;

when dispersed storage error encoding parameters of the first and second buckets match, creating new metadata regarding the data object being stored at the target DSN location, wherein the new metadata includes the target DSN location, data object information, and a logical address to logical address mapping such that the target DSN location points to the source DSN location and the data object is not physically present at a physical address space that corresponds to the target DSN location;

when the move data function is a copy and move operation, the source DSN location stores the data object and the target DSN location stores a data object copy:

receiving a request for a data segment of the data object copy;

retrieving a corresponding set of encoded data slices of the data segment from a first portion source DSN location;

decoding the set of encoded data slices to recover the data segment;

sending the recovered data segment to a user device of the DSN;

receiving from the user device, an edited data segment;

for the edited data segment:
dispersed storage error encoding the edited data segment to produce a new set of encoded data slices;
identifying a corresponding first portion of the target DSN location to that of a first portion of the source DSN location; and
sending the new set of encoded data slices to the DSN memory for storage in the first portion of the target DSN location.

2. The method of claim 1 further comprises:
when the move data function is a move and delete operation, deleting old metadata regarding the data object, wherein the old metadata includes the source DSN location and the data object information.

3. The method of claim 2 further comprises:
establishing a second logical address to logical address mapping of the source DSN location to the target DSN location such that, for a subsequent data object written to the source DSN location, the subsequent data object is stored at the physical address space that corresponds to the target DSN location.

4. The method of claim 1, wherein the identifying includes:
updating the new metadata such that the logical address to logical address mapping of the first portion of the target DSN location points to the first portion of the target DSN location to reflect that the new set of encoded data slices is physically present at a first portion of the physical address space that corresponds to the first portion of the target DSN location.

5. The method of claim 1, wherein the dispersed storage error encoding parameters includes one or more of:
an error coding function;
an encryption function;
a pillar width number;
a decode threshold number;
a number of data segments per data object; and
a vault identifier.

6. A method for execution by a computing device of a dispersed storage network (DSN) comprises:
receiving a request for a move data function regarding a data object, wherein the data object includes a plurality of data segments that is dispersed storage error encoded into plurality of sets of encoded data slices, wherein the plurality of sets of encoded data slices is stored at a source DSN location in a first bucket of memory of the DSN, wherein the move data function includes a target DSN location within a second bucket of the memory of the DSN;
determining dispersed storage error encoding parameters of the first and second buckets;
when dispersed storage error encoding parameters of the first and second buckets match, creating new metadata regarding the data object being stored at the target DSN location, wherein the new metadata includes the target DSN location, data object information, and a logical address to logical address mapping such that the target DSN location points to the source DSN location and the data object is not physically present at a physical address space that corresponds to the target DSN location; and
updating a reference count associated with the data object based on the move data function,
wherein determining a storage location for the reference count further comprises:
determining whether a size of the data object is greater than a size threshold;
when the size of the data object is greater than the size threshold, storing the reference count as separate metadata; and
when the size of the data object is less than or equal to the size threshold, storing the reference count by embedding the reference count in a data segment of the data object.

7. A computer readable storage device comprises:
a first memory element that stores operational instructions, that when executed by a computing device of a dispersed storage network (DSN), causes the computing device to:
receive a request for a move data function regarding a data object, wherein the data object includes a plurality of data segments that is dispersed storage error encoded into plurality of sets of encoded data slices, wherein the plurality of sets of encoded data slices is stored at a source DSN location in a first bucket of memory of the DSN, wherein the move data function includes a target DSN location within a second bucket of the memory of the DSN;
a second memory element that stores operational instructions, that when executed by the computing device, causes the computing device to:
determine dispersed storage error encoding parameters of the first and second buckets;
when dispersed storage error encoding parameters of the first and second buckets match, create new metadata regarding the data object being stored at the target DSN location, wherein the new metadata includes the target DSN location, data object information, and a logical address to logical address mapping such that the target DSN location points to the source DSN location and the data object is not physically present at a physical address space that corresponds to the target DSN location;
a third memory element that stores operational instructions, that when executed by the computing device, causes the computing device to:
when the move data function is a copy and move operation, the source DSN location stores the data object and the target DSN location stores a data object copy:
receive a request for a data segment of the data object;
retrieve a corresponding set of encoded data slices of the data segment from a first portion source DSN location;
decode the set of encoded data slices to recover the data segment;
send the recovered data segment to a user device of the DSN;
receive from the user device, an edited data segment;
for the edited data segment:
dispersed storage error encode the edited data segment to produce a new set of encoded data slices;
identify a corresponding first portion of the target DSN location to that of a first portion of the source DSN location;
send the set of encoded data slices to the DSN memory for storage in the corresponding first portion of the target DSN location; and
send the new set of encoded data slices to the DSN memory for storage in the first portion of the source DSN location.

8. The computer readable storage device of claim 7 further comprises:
a third memory element that stores operational instructions, that when executed by the computing device, causes the computing device to:

when the move data function is a move and delete operation, delete old metadata regarding the data object, wherein the old metadata includes the source DSN location and the data object information.

9. The computer readable storage device of claim 8, wherein the third memory element stores further operational instructions, that when executed by the computing device, causes the computing device to:
establish a second logical address to logical address mapping of the source DSN location to the target DSN location such that, for a subsequent data object written to the source DSN location, the subsequent data object is stored at the physical address space that corresponds to the target DSN location.

10. The computer readable storage device of claim 7, wherein the third memory element stores further operational instructions, that when executed by the computing device, causes the computing device to:
update the new metadata such that the logical address to logical address mapping of the first portion of the target DSN location points to the first portion of the target DSN location to reflect that the set of encoded data slices is physically present at a first portion of the physical address space that corresponds to the first portion of the target DSN location.

11. The computer readable storage device of claim 7 further comprises:
a third memory element that stores operational instructions, that when executed by the computing device, causes the computing device to:
update a reference count associated with the data object based on the move data function.

12. The computer readable storage device of claim 7, wherein the dispersed storage error encoding parameters includes one or more of:
an error coding function;
an encryption function;
a pillar width number;
a decode threshold number;
a number of data segments per data object; and
a vault identifier.

* * * * *